(12) United States Patent
Habberstad et al.

(10) Patent No.: US 8,050,569 B2
(45) Date of Patent: Nov. 1, 2011

(54) DEVICE FOR OPTICAL REMOTE MONITORING AND SYSTEM COMPRISING SUCH A DEVICE

(75) Inventors: Hans Habberstad, Linköping (SE); Fredrik Kullander, Ljungsbro (SE); Ove Steinvall, Linköping (SE)

(73) Assignee: Totalförsvarets Forskningsinstitut, Stockholm (SE)

( * ) Notice: Subject to any disclaimer, the term of this patent is extended or adjusted under 35 U.S.C. 154(b) by 664 days.

(21) Appl. No.: 11/793,140

(22) PCT Filed: Dec. 8, 2005

(86) PCT No.: PCT/SE2005/001868
§ 371 (c)(1),
(2), (4) Date: Jun. 18, 2007

(87) PCT Pub. No.: WO2006/065203
PCT Pub. Date: Jun. 22, 2006

(65) Prior Publication Data
US 2008/0131115 A1 Jun. 5, 2008

(30) Foreign Application Priority Data
Dec. 17, 2004 (SE) .................................... 0403074

(51) Int. Cl.
*H04B 10/00* (2006.01)
*G02B 5/22* (2006.01)
*G02B 26/00* (2006.01)
(52) U.S. Cl. ......... 398/118; 398/169; 398/170; 359/529
(58) Field of Classification Search .................. 398/118; 359/529
See application file for complete search history.

(56) References Cited

U.S. PATENT DOCUMENTS

| 4,517,569 | A | * | 5/1985 | Gerharz | 342/6 |
|---|---|---|---|---|---|
| 4,784,448 | A | | 11/1988 | Sepp et al. | |
| 4,887,310 | A | * | 12/1989 | Meyzonnette et al. | 398/170 |
| 5,262,884 | A | | 11/1993 | Buchholz | |
| 5,995,260 | A | * | 11/1999 | Rabe | 398/115 |
| 6,055,080 | A | * | 4/2000 | Furstenau et al. | 398/139 |
| 6,154,551 | A | * | 11/2000 | Frenkel | 381/172 |
| 6,233,088 | B1 | * | 5/2001 | Roberson et al. | 359/291 |
| 6,461,003 | B1 | * | 10/2002 | Neudeck | 359/529 |
| 6,906,807 | B2 | * | 6/2005 | Paritsky et al. | 356/601 |
| 7,268,930 | B1 | * | 9/2007 | Padilla et al. | 359/237 |
| 7,345,804 | B1 | * | 3/2008 | Sayyah et al. | 359/248 |
| 7,831,150 | B2 | * | 11/2010 | Roes et al. | 398/130 |
| 7,852,543 | B2 | * | 12/2010 | Goetz et al. | 359/245 |
| 7,950,812 | B2 | * | 5/2011 | Roes et al. | 359/529 |
| 2002/0093881 | A1 | * | 7/2002 | Kane | 367/149 |

(Continued)

FOREIGN PATENT DOCUMENTS
FR  2 247 032  5/1975
(Continued)

*Primary Examiner* — Shi K Li
*Assistant Examiner* — Oommen Jacob
(74) *Attorney, Agent, or Firm* — Jacobson Holman PLLC

(57) ABSTRACT

A device for optical remote monitoring, preferably an optically readable membrane-based microphone, and a system including such a device is provided. The device for optical remote monitoring includes a retroreflector and an acoustic membrane. The acoustic membrane suitably is a light-modulating component and modulates the reflection of an incident light beam in relation to the pressure field, from a sound source, to which the membrane is exposed. The retroreflector may be a corner cube having three sides with the membrane arranged on one of the sides. The membrane can be part of a side or one side may consist of a membrane.

13 Claims, 1 Drawing Sheet

U.S. PATENT DOCUMENTS

| | | | |
|---|---|---|---|
| 2003/0081293 A1* | 5/2003 | Wood et al. | 359/172 |
| 2004/0075880 A1* | 4/2004 | Pepper et al. | 359/212 |
| 2004/0090676 A1* | 5/2004 | Jackson et al. | 359/529 |
| 2004/0252930 A1* | 12/2004 | Gorelik et al. | 385/12 |
| 2005/0231803 A1* | 10/2005 | Handerek et al. | 359/529 |
| 2007/0273948 A1* | 11/2007 | Roes et al. | 359/222 |

FOREIGN PATENT DOCUMENTS

| | | |
|---|---|---|
| JP | 2 190099 | 7/1990 |
| WO | WO 2004/038963 A2 | 5/2004 |

* cited by examiner

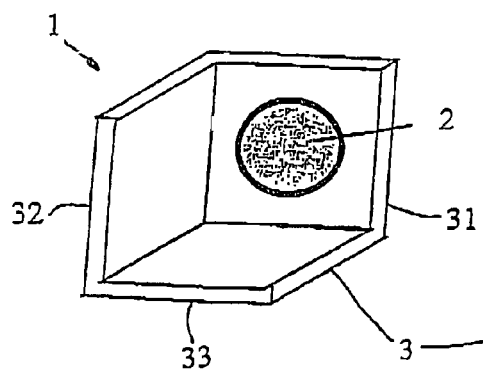
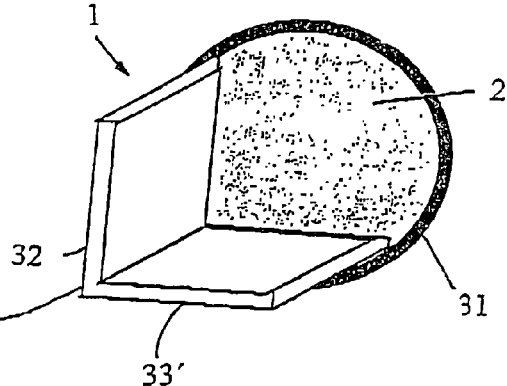
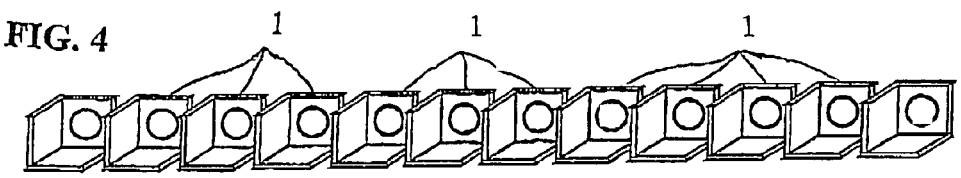
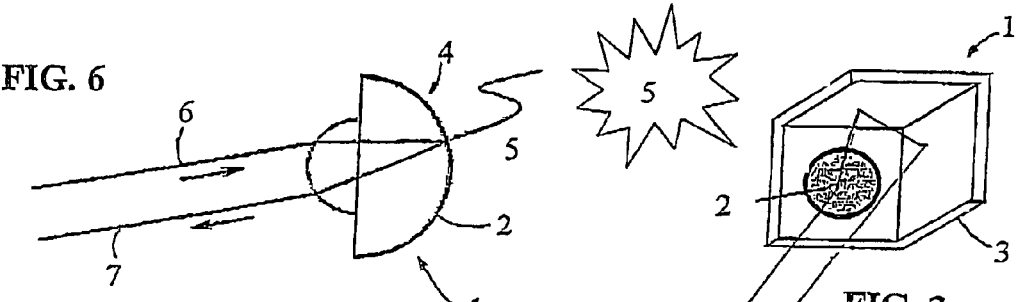
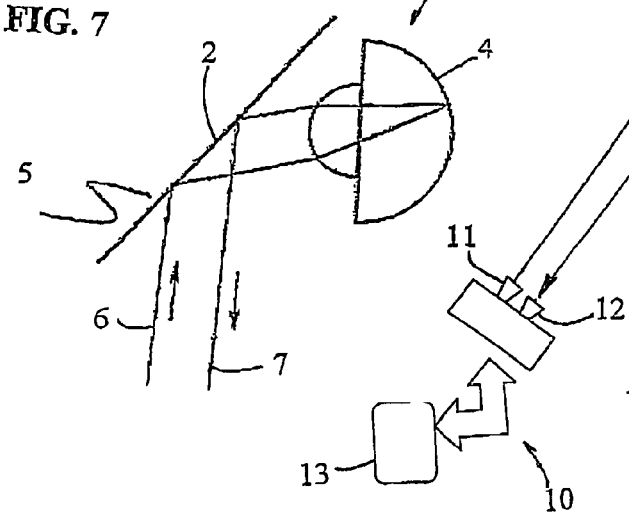
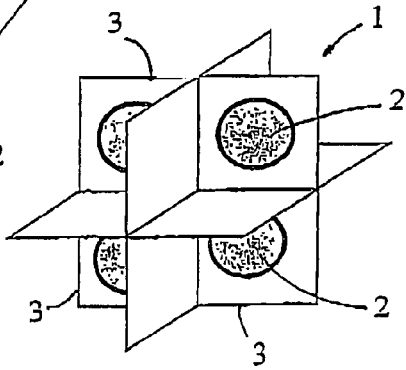
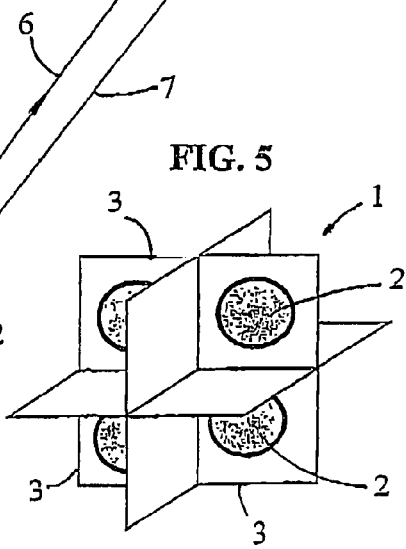

DEVICE FOR OPTICAL REMOTE MONITORING AND SYSTEM COMPRISING SUCH A DEVICE

This is a nationalization of PCT/SE2005/001868 filed 8 Dec. 2005 and published in English.

BACKGROUND OF THE INVENTION

1. Field of the Invention

The invention relates to a device for optical remote monitoring, preferably an optically readable membrane-based microphone, and a system comprising such a device.

2. Description of the Related Art

It is known to use optical techniques for remote monitoring. Prior-art solutions comprise, inter alia, the laser radar technique for vibration analysis. The laser radar is directed to existing objects in the vicinity of the sound that is to be detected. However, it is difficult to achieve a desirable detection level using current methods. This is partly due to the fact that the intensity of the backscattered light from common surfaces is relatively low. In addition, it is not quite certain that the illuminated surface has a strong connection to the surrounding pressure field.

To avoid these problems, it is known to use an optically readable microphone. The microphone is placed close to the sound source so that it can detect the pressure field. The microphone is illuminated and the reflection is processed in order to recreate the sound. U.S. Pat. No. 5,262,884 discloses, for instance, a microphone comprising a membrane with a lens on one side. The light is directed into the lens and the modulated reflection is registered by a detector. The abstract of JP 2190099 discloses another microphone where a mirror is placed on the membrane to improve the reflection of the laser.

However, these solutions do not always provide very clear results. There is also a risk of disturbances and monitoring.

SUMMARY OF THE INVENTION

The present invention relates to an alternative solution which reduces the above-mentioned drawbacks by using a device for optical remote monitoring that includes a retroreflector and a light-modulating acoustic membrane which modulates the reflection of an incident light beam in relation to the pressure field, from a sound source, to which the membrane is exposed.

The retro-reflector may be embodied as a corner cube having three sides, and the membrane may be arranged on one of the sides or one of the sides may consist of a membrane. According to one embodiment, the retro-reflector includes a cat's eye, and the membrane may be arranged along the rear curved surface of the cat's eye. The membrane may also be arranged as an angled reflector in front of the cat's eye.

The present invention further includes a system for remote monitoring including a light source, a sensor and a unit for signal processing of a signal received from the sensor in which the system includes a device having a retroreflector and a light-modulating acoustic membrane which modulates the reflection of an incident light beam in relation to the pressure field, from a sound source, to which the membrane is exposed. The system may include two or more devices for optical remote monitoring arranged in succession along a line.

BRIEF DESCRIPTION OF THE DRAWINGS

Embodiments will now be described with reference to the following Figures:

FIG. 1 shows a retroreflector with a membrane.
FIG. 2 shows a retroreflector with a membrane.
FIG. 3 shows a system.
FIG. 4 shows a plurality of retroreflectors in series.
FIG. 5 shows a plurality of retroreflectors arranged to form a cube.
FIG. 6 shows a retroreflector in the form of a cat's eye.
FIG. 7 shows a retroreflector in the form of a cat's eye.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGS. 1-2 and 6-7 show a device (1) for optical remote monitoring according to various embodiments. The device (1) comprises a retroreflector (3, 4) and an acoustic membrane (2). A retroreflector is a device that reflects incident light back to the source of the incident light. By light is meant a wider wave range than only visible light, that is also UV and IR light for instance. The acoustic membrane (2) is a light-modulating component and modulates the reflection of an incident light beam (6) in relation to the pressure field (5), from a sound source, to which the membrane (2) is exposed.

FIGS. 1-2 show the device (1) with a retroreflector comprising a corner cube (3) with three sides (31, 32, 33; 31', 32', 33'). In FIG. 1, the membrane (2) is arranged on one of the sides (31) and constitutes a part of this side (31). In FIG. 2, the membrane (2) covers the whole side (31'), the side (31') consisting of said membrane (2).

The invention can also be used with other types of retroreflector. For instance, what is referred to as a cat's eye can be used as a retroreflector. In a cat's eye, a lens or a lens system in combination with a reflecting rear face is used to reflect incident light. For instance a lens in combination with a curved rear face can be used, like an eye, to reflect light falling on the lens surface. A plurality of optical elements (lenses and/or mirrors) makes it possible to obtain retroreflections also with flat rear faces. FIGS. 6-7 show the device (1) with a retroreflector in the form of a cat's eye (4). In FIG. 6, the rear curved surface comprises a membrane (2), or alternatively the rear curved surface may consist of a membrane. The space inside the membrane (2) suitably contains a gas to allow the membrane (2) to pivot freely when exposed to the pressure field (5). In FIG. 7, a membrane (2) is arranged as an angled reflector in front of the cat's eye (4).

FIG. 3 shows a system (10) according to the invention. The system (10) for optical remote monitoring comprises a light source (11), a sensor (12), a unit (13) for signal processing of a signal (7) received from the sensor (12), and a device (1), a microphone, as stated above. The device (1) can be used alone or, for more complex measurements, two or more microphones can be arranged in combination. In the Figure the system is exemplified with a retroreflector in the form of a corner cube (3). It is also possible to use other types of corner cubes, such as shown in FIG. 2 for instance, or other types of retroreflectors such as a cat's eye, according to FIGS. 6-7.

When a plurality of devices/microphones are combined in geometric configurations and/or placed connected to each other, the scattering direction of the sound can be analysed. FIG. 4 illustrates an example of how a plurality of devices (1)

can be arranged in succession along a line. A plurality of devices (1) can also be combined to increase the field of vision in which they jointly retroreflect light. FIG. 5 illustrates an example where eight corner reflectors (3) are arranged in a cube in order to retroreflect light in an increased field of vision.

The use of a plurality of devices in a system makes it possible, for instance, to determine the direction to the sound source and any movement of the sound source. Reading can take place by all devices being illuminated by same light source, or a plurality of light sources can be used. The signals from the different devices can then be distinguished by, for instance, optical multiplexing.

The device means that a light-modulating acoustic membrane is combined with a retroreflecting device, a retroreflector, so that the light reflected from the device carries a modulation corresponding to the pressure field from a sound source in connection with the microphone membrane. The membrane provides a good connection between the pressure field and the light. The retroreflection is included to allow a reasonable optical effect to be retroreflected on an optical sensor in connection with an illuminating light source. A number of different embodiments of retroreflectors and of how the membrane can be arranged are available.

A relatively simple membrane vibrates with the sound/pressure field in its environment. Intensity and phase modulation in the retroreflective optical field occurs by the shape and position of the reflecting surface being changed. The shape changes from convex to concave around a plane equilibrium, which focuses and defocuses the light. The intensity of a detector with a limited aperture, adjacent to a light source, may thus be modulated. The change in the position of the mirror surface can also be measured interferometrically and/or polarometrically, a technique making it possible to measure the relative phase and/or polarisation of an optical field. The deflection of the mirror surface, that is the acoustic membrane, will then be measured with a higher resolution, thus allowing a fainter sound to be detected. For instance, in interferometric measurements, the reflected light is mixed with reference light for interference to occur as a function of the difference in phase in the reflected light and the reference light. A common way of generating the reference light is to link part of the light from the emitting light source (11) to the sensor (12) locally in the system for remote monitoring (10).

A retroreflector in the form of a corner cube retroreflects light falling on it within a limited field of vision. The retroreflective light is always mirrored in three surfaces. A way of providing a device/microphone is to replace one side or part of one side of the corner cube with an acoustic membrane with a reflective surface.

The device has a number of advantages. It is inexpensive to manufacture, reliable and robust, takes up a small space when stored and in use and is easy to apply. A great advantage is that the device is passive, that is difficult to discover, and moreover no power supply to the device is necessary.

The device/microphone for optical remote monitoring comprises a retroreflector (3, 4) and an acoustic membrane (2). The acoustic membrane (2) suitably is a light-modulating component and modulates the reflection of an incident light beam (6) in relation to the pressure field (5), from a sound source, to which the membrane (2) is exposed. The retroreflector (3, 4) may comprise a corner cube (3) having three sides (31, 32, 33; 31', 32', 33') with the membrane (2) arranged on one of the sides. The membrane (2) can be part of a side (31), or one side (31') may consist of a membrane (2). In another embodiment, the retroreflector (3, 4) may comprise a cat's eye (4). The membrane (2) can then be arranged along the rear curved surface of the cat's eye or as an angled reflector in front of the cat's eye (4).

The system for remote monitoring (10) comprises a light source (11), a sensor (12), a unit (13) for signal processing of a signal (14) received from the sensor (12), and a device (1) as described above. The system may comprise two or more devices (1) arranged in succession along a line.

Now follow a number of examples of applications in which the invention can be used. Speech transmission between individuals in situations where the risk of being revealed must be small or in which other techniques of communication cannot be used (for instance, for the police or commando units). In rescue operations where the invention may be included as a component in life saving equipment for locating and communication with the person in distress. Monitoring through windows and windscreens by the microphone device being placed in the space in the line of sight for illumination. Locating vehicle noise, firing of weapons etc. by direction finding, where a plurality of microphone devices are arranged and cooperate, an optical transceiver unit is used to register the signals from the microphone units. The invention can also replace radio communication in local ground sensor networks or be used to measure and monitor vibrations for civilian purposes in, for instance, the building and manufacturing industry.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A device for optical remote monitoring comprising a retroreflector including a corner cube having three sides and a light-modulating acoustic membrane which modulates the reflection of an incident light beam in relation to a pressure field, from a sound source, to which the membrane is exposed, said membrane being on one of the three sides of said corner cube, said retroreflector being configured to reflect an optical effect from said incident light beam onto an optical sensor that effectively provides remotely located monitoring capability.

2. The device as claimed in claim 1, wherein the membrane is part of a side.

3. The device as claimed in claim 1, wherein one side is a membrane.

4. A system for remote monitoring comprising a light source, a sensor, a unit for signal processing of a signal received from the sensor and a device for optical remote monitoring including a retroreflector with a corner cube having three sides and a light-modulating acoustic membrane which modulates the reflection of an incident light beam in relation to a pressure field, from a sound source, to which the membrane is exposed, said membrane being on one of the three sides of said corner cube, said retroreflector being configured to reflect an optical effect from said incident light beam onto an optical sensor that effectively provides remotely located monitoring capability.

5. The system as claimed in claim 4, wherein two or more of said devices for optical remote monitoring are arranged in succession along a line.

6. The device as set forth in claim 1, wherein said remote monitoring capability provided by said device is effective for detecting speech between individuals at a distance remote enough such that risk of the device being detected by said individuals is low.

7. The device as set forth in claim 1, wherein said remote monitoring capability provided by said device is effective to replace radio communication in local ground sensor networks.

8. The system as set forth in claim 4, wherein the membrane is part of a side.

9. The system as set forth in claim 8, wherein one side is a membrane.

10. The system as set forth in claim 4, wherein said remote monitoring capability provided by said device is effective to replace radio communication in local ground sensor networks.

11. The system as set forth in claim 4, wherein said remote monitoring capability provided by said device is effective for detecting speech between individuals at a distance remote enough such that risk of the device being detected by said individuals is low.

12. The device as claimed in claim 1, wherein the membrane is of a type used in microphones.

13. The system as claimed in claim 4, wherein the membrane is of a type used in microphones.

\* \* \* \* \*